Dec. 18, 1951     J. P. ECKERT, JR., ET AL     2,579,141
STRUCTURE FOR ELECTRICAL APPARATUS

Filed Feb. 18, 1949     6 Sheets-Sheet 3

INVENTORS.
John Presper Eckert Jr.
John C. Sims Jr.
Isaac L. Auerbach
by George V. Woodling
Attorney Dec. 18, 1951     J. P. ECKERT, JR., ET AL     2,579,141
STRUCTURE FOR ELECTRICAL APPARATUS
Filed Feb. 18, 1949     6 Sheets-Sheet 4
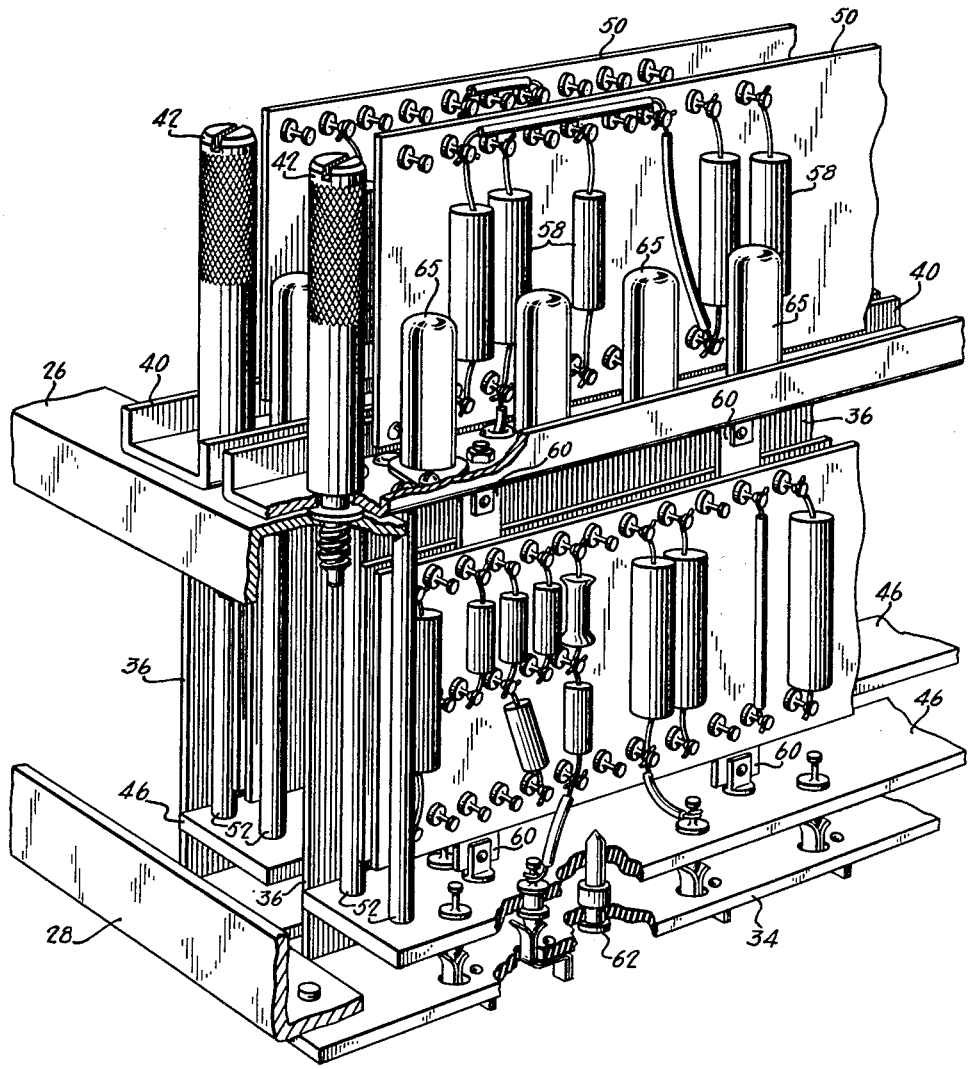
_Fig. 6._
INVENTORS.
John Presper Eckert Jr.
John C. Sims Jr.
Isaac L. Auerbach
by
Attorney Dec. 18, 1951     J. P. ECKERT, JR., ET AL     2,579,141
STRUCTURE FOR ELECTRICAL APPARATUS
Filed Feb. 18, 1949     6 Sheets-Sheet 5

INVENTORS.
John Presper Eckert Jr.
John C. Sims Jr.
Isaac L. Auerbach
by George V. Woodling
Attorney Dec. 18, 1951   J. P. ECKERT, JR., ET AL   2,579,141
STRUCTURE FOR ELECTRICAL APPARATUS
Filed Feb. 18, 1949   6 Sheets-Sheet 6

INVENTORS.
John Presper Eckert Jr.
John C. Sims Jr.
Isaac L. Auerbach
by George V. Petroll
Attorney Patented Dec. 18, 1951

2,579,141

UNITED STATES PATENT OFFICE 2,579,141

STRUCTURE FOR ELECTRICAL APPARATUS

John Presper Eckert, Jr., John C. Sims, Jr., and Isaac L. Auerbach, Philadelphia, Pa., assignors to Eckert-Mauchly Computer Corporation, Philadelphia, Pa., a corporation of Pennsylvania Application February 18, 1949, Serial No. 77,132

16 Claims. (Cl. 175—298)

This invention relates to a structure and method of assembly for electrical apparatus and more particularly to a structure and method of assembly especially adapted to provide for convenient mounting, effective cooling and ready access to large numbers of components.

The development of large scale electronic digital computers in recent years has brought into existence tremendously complex organizations of thousands of electronic valves and electrical components. If such computers are to have a reasonable degree of utility they must be compressed to an extent permitting their installation and operation in existing buildings of conventional dimensions. In the past the only such electronic computers which have been constructed have been so huge as to require the provision of special housing for them. This, obviously, is a serious handicap to the future widespread application of such devices as it will, in many cases, double or even treble the cost of installation and of operation. In reducing the size of such equipment, however, the designer is faced with serious offsetting problems in the form of heat dissipation requirements and the requirement for ready access to each and every component forming a part of such apparatus.

One of the objects of the invention is to provide a new and novel mode of assembly for large scale electronic apparatus.

Another object of the invention is to provide large scale electrical apparatus with a relatively high density of components per unit volume.

Still another object of the invention is to provide a relatively dense structure of electric valves and dissipative elements characterized by its ready adaptation for effective cooling.

Yet another object of the invention is to provide a new and novel detachable electrical assembly offering a relatively rigid structure in which substantially the entire surface presented may be conveniently utilized for the mounting of the various active components.

Yet another object of the invention is to provide a new and novel demountable component subassembly providing for separation of the high and low dissipative circuit components.

A further object of the invention is to provide an assemblage of a multiplicity of cooperating active and passive circuit elements in which a portion of this apparatus may be readily mechanically segregated and made available for test and repairs while retaining its operating association with the remainder of the circuit configurations.

We have found that the structure best meeting the manifold requirements is one in which the basic components are assembled on the two sides of relatively flat demountable elements or chassis to which electrical connection is afforded through resilient contact members mounted along one of the faces of the chassis which engages a relatively fixed contact board secured to a part of the receiving frame.

The foregoing and other objects of the invention will become more apparent as the following detailed description of the invention is read in conjunction with the drawings in which:

Figure 6 is a view in perspective illustrating the chassis and frame in their normal cooperative relationship.

Figure 1:
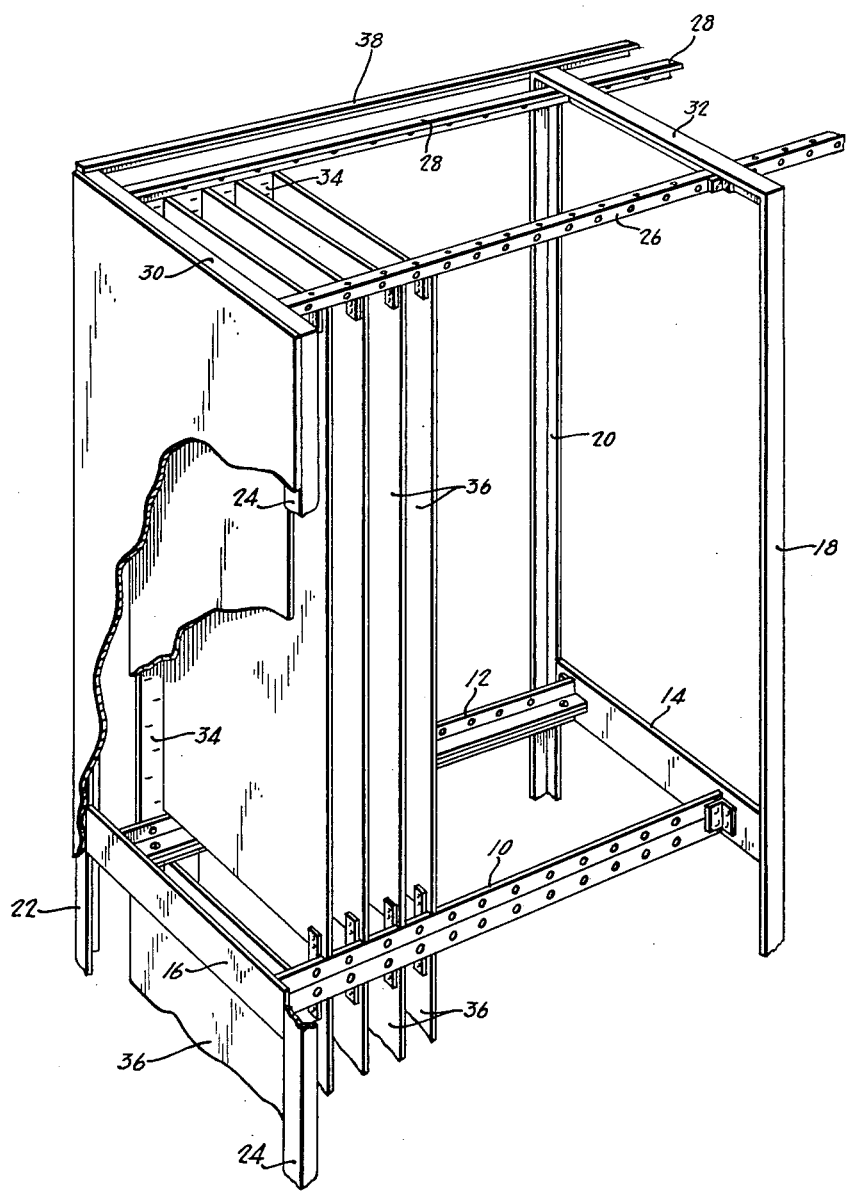
Figure 1 is a view in perspective of a computer frame unit viewed from the front.

Referring now to Figure 1 there may be observed the standard structural cell unit utilized in the construction of a computer or other large scale electrical apparatus. As many of these cells may be included as are required to house the quantity of apparatus required for the particular equipment design. The frame cell is made up of the front and rear bottom rails 10 and 12 affixed to the cross rails 14 and 16 which are in turn secured to the stiles 18, 20, 22 and 24. A pair of front and rear top rails 26 and 28 are also provided and secured to the upper cross members 30 and 32, likewise secured to the stiles 18, 20, 22 and 24. The front facing angles of the members 10 and 26 are provided with threaded apertures for a purpose later to be described, while the rear faces of the angles 12 and 28 are similarly provided with such apertures for the mounting of contact carrying backboards 34, which are secured thereto by screws engaging said apertures. In addition a plurality of conductive shielding partitions are secured at intervals to the rails 10, 12, 26 and 28 by small angle brackets mounted on the partitions 36 and secured to the upper and lower surfaces of the angle iron rails 10, 12, 26 and 28. Each pair of shielding partitions 36 embraces a backboard 34 with intermediate partitions serving as a common shield. The arrangement is further strengthened by securing the rear edge of each partition to one backboard 34, using screws or other suitable anchoring means.

Figure 2:
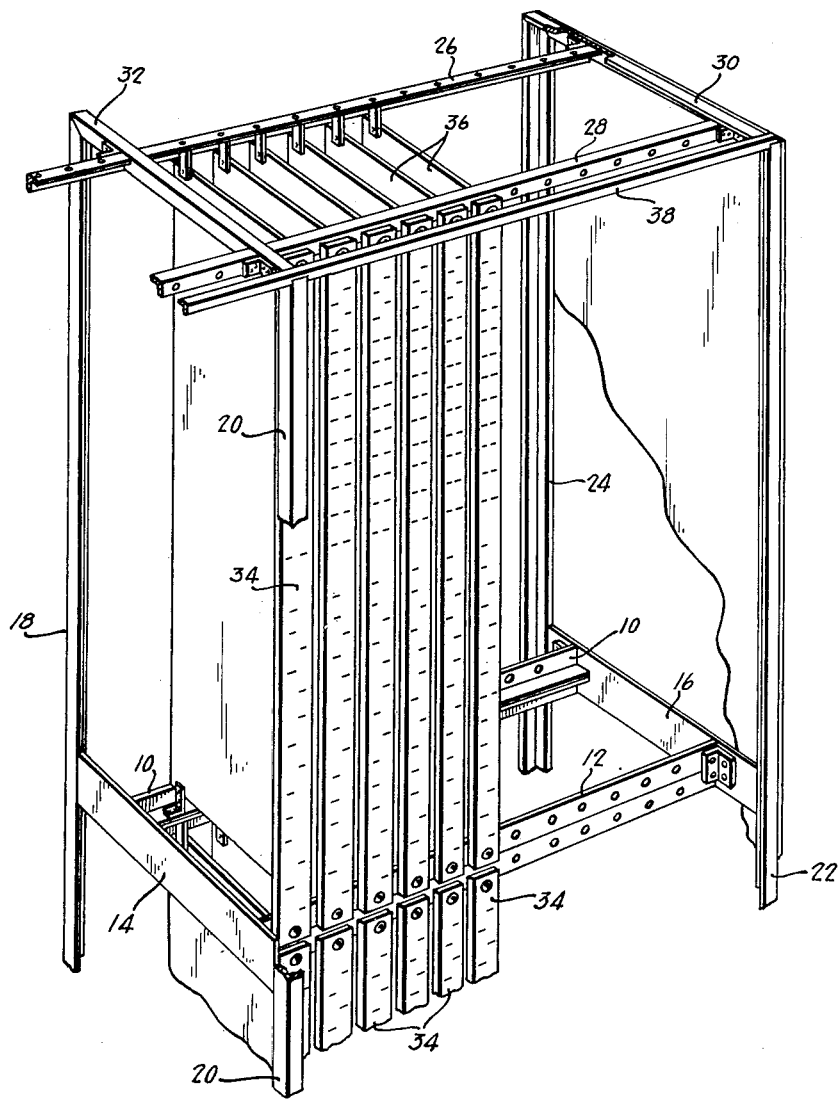
Figure 2 is a view in perspective of a computer frame unit viewed from the rear.
Figure 7:
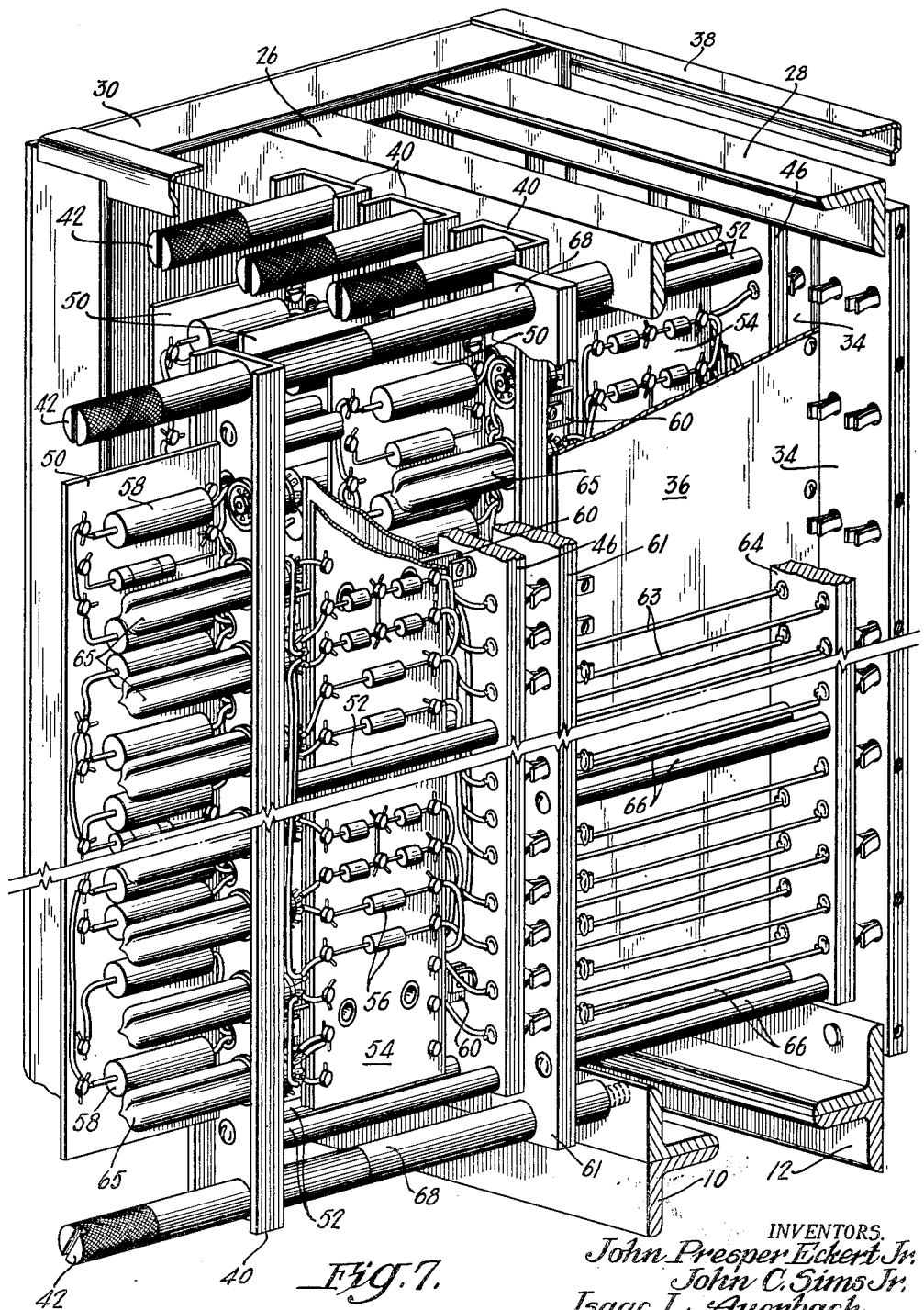
Figure 7 is a view in perspective illustrating a sector of a completed computing device with one of the chassis extended beyond its normal position for the purpose of inspection, test and/or adjustment.

The backboards 34 are provided with a suitable number of resilient bifurcated female contacts (illustrated in detail in Figures 6 and 7) having conductive projections on the rear surface of the backboards 34 to which may be secured the conductors completing the various operating circuits of the apparatus itself, as will be seen in Figure 2. In addition the structure is further strengthened by the rear cross bracing member 38 embracing all the cells.

The number of basic cells in the apparatus may be varied to meet the overall requirements, determined from the number of components which are included in the system under construction. If desired, it will be obvious that separate pairs of partitions may be provided for each backboard although it has been found in practice that the use of a single partition provides adequate shielding.

Figure 5:
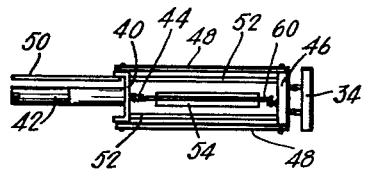
Figure 5 is an end view of the removable chassis element.
Figure 4:
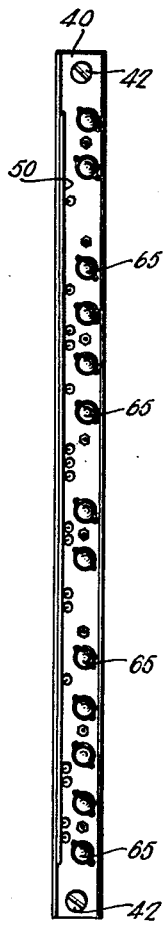
Figure 4 is a front view of the removable chassis element.
Figure 3:
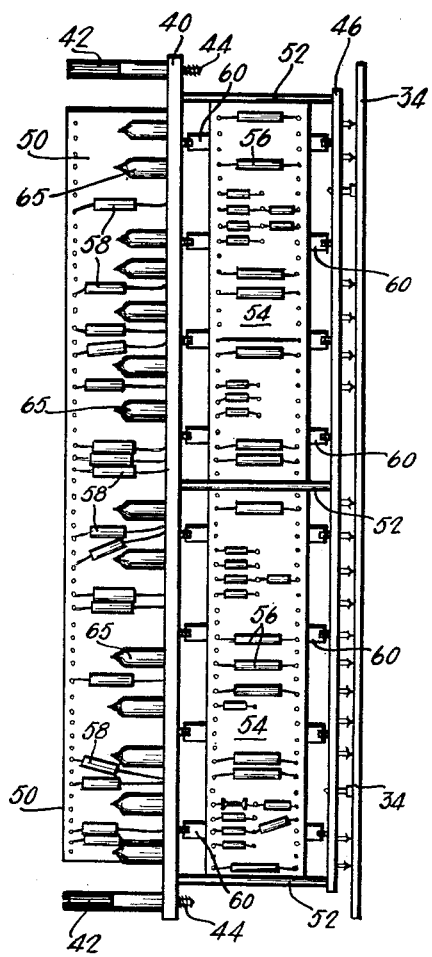
Figure 3 is a side view of one of the removable chassis elements which may be inserted in the framework illustrated in Figures 1 and 2.

The form and nature of the chassis utilized with the structure just described will be apparent from an inspection of Figures 3, 4 and 5. The chassis is built up on a channel member 40, apertured at either end to receive a captive mounting handle and locking screw 42 with the threaded stud 44. The spacers 52 are secured to the base of the channel 40 and extend therefrom, supporting at their other ends chassis contact boards 46 provided with a number of conical male contacts (see detail in Figures 6 and 7) connected with the various circuit components present on the chassis. Low wattage terminal strips 54 are mounted between the base of the channel 40 and the chassis contact board 46. These terminal strips are provided with a number of electrical terminals between which are secured the various circuit components and elements indicated generally at 56, which are necessary to perform the intended operations of the apparatus. The terminal strips 54 may be eyeletted, one on either side of a plurality of lug carrying spacers 60, whose threaded extensions may be then secured to the chassis 40 along the front edge and to the chassis contact board 46 along the rear edge.

Another terminal strip 50 may be secured to one leg of the channel 40 and, with the terminals secured thereto, provide mounting facilities for additional components dissipating considerable amounts of energy indicated generally at 58. In addition a number of tube sockets are mounted through the channel 40 with their prongs adjacent the terminal strips 54. The tubes or electric valves 65 are situated in their sockets with their envelopes projecting on the leg side of the channel 40 in the same direction as the terminal strip 50. As is well known, the electric valves develop considerable heat during their operation. This heat is localized on the leg side of the channel 40 by virtue of the tube mounting position. The additional heat developed by the high dissipation circuit components during operation is similarly localized on this side of the chassis by mounting most of the elements which are called upon to dissipate large amounts of power during normal circuit operation on the terminal strip 50. These would include, for example, anode load resistors and bleeder resistors which may dissipate from 5 to 10 watts. Components which are inclined to be temperature sensitive, or which are called upon to dissipate only small amounts of power such as, for example, germanium crystal diodes, precision resistors, grid returns and the like are preferably mounted on the lower terminal strips 54 where they are isolated and protected from the influence of high temperatures. To this end a lower power dissipation density is maintained along the lower terminal strips 54 than is the case along the upper terminal strip 50. This is attained by dissipating fewer watts per linear inch of terminal strip length in the terminal strips 54 than is the case with terminal strip 50. The presently popular synthetic phenolic materials may be utilized as the material for the fabrication of these and such other terminal and contact boards and strips as appear in the structure.

The chassis shown in Figure 3 is illustrated without shields and is suitable for use in the apparatus of Figures 1 and 2 in which the structure itself includes shielding partitions. It may be found that some more intimate shielding of the chassis is indicated, in which case a metal plate 48 may be secured to the chassis legs and to the chassis contact board 46. While only one side of the chassis has been illustrated in Figure 3, it will be clear from the central location of the terminal strips 54 in Figure 5 that there are two strips located back to back, each carrying its complement of components, and that these components are therefore distributed on either side of the chassis for best utilization of all space available. The detailed view of Figure 6 illustrates a pair of chassis in position within the frame earlier described. The channels 40 are secured in position against the mounting face of the angle rail 26 by the handle 42 threadedly engaging a corresponding aperture in said mounting face. The spacing between the mounting face and the rail 26 and the rear face of the rail 28 is such as to maintain the back contact board 34 at a distance insuring positive engagement of the contacts on chassis contact board 46 with their corresponding female contacts of back contact board 34 under the retaining influence of the mounting handles 42.

The view of Figure 6 clearly illustrates the contact structure, the female contact on the back contact board 34 consisting of a pair of resilient members which are spread apart under the influence of the engaging male member, and whose diverging ends are at such an angle as to insure that the angle of repose is exceeded, whereby no positive force is required to separate these cooperating contacts. Thus, the destructive separating forces required in conventional structures and resultant damage are entirely avoided. As an example, in some chassis designs more than fifty separable contacts must be provided. If the conventional pin and jack connections are relied upon, forces of eight ounces or more may be required for the separation of each such contact pin, which would mean a separating force of twenty-five pounds or more. This can be controllably provided only through the use of expensive and space consuming cam and lever combinations or their equivalent. If such an expedient is not employed, when the contacts finally break loose the chassis may be dropped or strike against some other object during its rapid removal by the operating personnel. With the structure illustrated, however, loosening of the handles 42 relieves the engaging pressure on the contact plugs and the chassis may then be simply lifted out under perfect control of the personnel at all times.

It will be further noted that the contacts on the chassis contact board 46 and contact backboard 34 are separated by considerable amounts thereby decreasing the capacity between the adjacent members. This is an important advantage over the more compact pin and jack assembly frequently encountered. It is of special importance in connection with high speed computation where undesired coupling between adjacent circuits may cause the addition or cancellation of impulses with disastrous influence on the computation accuracy.

When a large number of chassis are incorporated it becomes desirable to prevent the insertion of chassis into incorrect positions. This is done by mounting pilot pins, such as that illustrated at 62 in Figure 6, on the contact backboard 34. A corresponding opening is provided in the chassis contact board 46, whereby only the correct chassis may be inserted far enough to permit engagement of the threaded extensions of the handles 42.

The three dimensional distribution of components resulting from the structure so far described requires some special provision to make for ready availability for any portion of the equipment which may require inspection and test. The method of affording such access will become clear from a consideration of Figure 7. Here there is utilized an extender chassis consisting of front contact board 61 and rear contact board 64 secured each to the other and separated by spacers 66, corresponding contacts on the two boards being connected by straight-through conductors 63. Each extender chassis is provided with a pair of captive mounting handles 68 provided with threaded stud extensions engaging corresponding apertures in the upper and lower mounting rails 26 and 10. The outer ends of the extender chassis mounting handles 68 are tapped to receive the studs on the operating chassis handles 42. The operating chassis is secured in this manner to the extender chassis with its contacts in engagement with the associated extender chassis contacts by screwing the mounting handles 42 into the tapped apertures in the extender chassis handles 68. The extender chassis is so proportioned that it brings the chassis contact board 46 out beyond the level of the remaining operating chassis, whereby test and maintenance personnel have ready access to the various circuit tie points for the measurement of operating voltages, wave forms, and replacement of components while every part of the operating chassis yet retains its operative relationship with the remainder of the subassemblies constituting the complete computer.

Figures 8, 9:
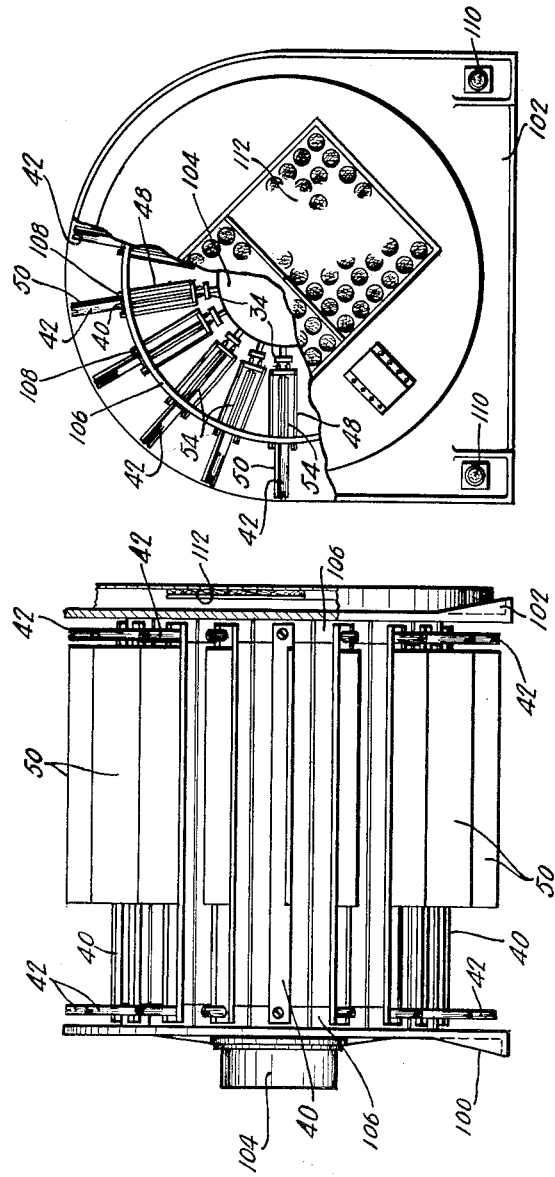
Figure 8 illustrates a cylindrically shaped section of the computer incorporating the principles of the invention.
Figure 9 is an end view of the cylindrical assembly in Figure 8 shown partially cut away.

The illustrations and descriptions so far have dealt with the application of this construction principle to frames of substantially rectilinear form. An alternative application to a structure of substantially cylindrical form may be seen in Figures 8 and 9, representing a mechanical structure for a high speed acoustic memory as has been described in co-pending application Serial No. 783,328, Memory System, filed on behalf of John Presper Eckert, Jr., and John Mauchly.

The mechanical mercury memory assembly consists of a pair of end castings, 100 and 102, centrally apertured to receive a tube 104 housing a tank of mercury utilized for acoustic storage of digital information as described in the aforementioned application. The tube 104 extends between and is anchored to each of the end plates 100 and 102. Substantially concentrically with the tube 104, each end plate is provided with a substantial integrally cast internal flange providing a maintaining surface for the chassis indicated generally at 108. These chassis are of the shielded form described in connection with Figures 3, 4 and 5 and are secured to the mounting face provided by the upstanding flange 106 through the use of mounting handles 42. A group of contact bearing backboards 34 are disposed circumferentially about the central tube 104 and provide the means for connecting together the various internal operating circuits of the memory. External connections to other apparatus are made through the socket 110. These recirculation chassis 108 are each individually shielded and, as is seen, they extend radially of the central tube 104. Air circulation for cooling purposes flows axially, the end castings 100 and 102 being apertured for this purpose. Air passes through the filter 112 which may be mounted in a plate over one of the end members and is exhausted at the other end. The air flow itself is confined by a housing which may be slipped over the unit, although it is not shown in this view. As described before in connection with Figure 7 it is clear that a similar extender chassis may be utilized with the cylindrical assembly of Figures 8 and 9 to bring any desired recirculation chassis into a more accessible position, this serving to extend any selected recirculation chassis beyond its members for test, maintenance and adjustment purposes.

No attempt has been made to discuss operating circuit details in outlining the invention, as it is applicable to all large scale electronic apparatus, regardless of its purpose and internal mode of operation, as the resultant 3-dimensional distribution of parts affords the greatest possible density and efficient utilization of space. It will be obvious to those skilled in the art that the invention may find wide application with appropriate modification to meet the individual design circumstances, but without substantial departure from the essence of the invention.

What is claimed is:

1. In a structure accommodating electrical apparatus, a frame having a first arcuate mounting face, a second arcuate mounting face on said frame spaced from said first face, a plurality of electric contact members secured in predetermined relation to said arcuate mounting faces, and a component bearing element detachably secured in abutting relationship with said arcuate mounting faces, said component bearing element having a plurality of contact members maintained in engagement with first mentioned contact members when said component bearing element is so secured.

2. In a structure accommodating electrical apparatus, a frame having a first arcuate mounting face, a second arcuate mounting face on said frame similar to and spaced from said first face, a plurality of electric contact members carried by said frame in predetermined relation to said arcuate mounting faces, and a component bearing element detachably secured in abutting relationship with said arcuate mounting faces, said component bearing element having a plurality of contact members maintained in resilient engagement with said first mentioned contact members when said component bearing element is so secured.

3. In a structure accommodating electrical apparatus, a frame having a first mounting face, a second mounting face on said frame spaced from said first face, arcuate sheet of relatively non-conductive material carried by said frame in predetermined relation to said mounting faces and provided with a plurality of contact members, and a component bearing element detachably secured in abutting relationship with said mounting faces and having contacts maintained in resilient engagement with the contacts of said contact bearing sheet, each set of engaging contacts comprising a clasping and a clasped member in which the angle of engagement is greater than the angle of repose.

4. In a structure accommodating electrical apparatus, a frame having first and second mounting rails presenting mounting flanges lying in substantially the same plane, a contact carrying backboard having a length substantially equal to the separation between said mounting flanges supported by said frame in a plane substantially parallel to the plane defined by said mounting flanges and spaced therefrom, and a component bearing element detachably secured in abutting relationship with said mounting flanges and having contacts received by the contacts situated on said backboard in a direction substantially perpendicular to the plane defined by said mounting flanges.

5. In a structure accommodating electrical apparatus, a frame having first and second mounting rails presenting mounting flanges lying in substantially the same plane, a plurality of contact carrying backboard strips supported in a plane substantially parallel to the plane defined by said mounting flanges and spaced therefrom, conductive shielding partitions embracing said backboard strips individually, and a plurality of component bearing elements detachably secured in abutting relationship with said mounting flanges having contacts received by the contacts situated on their associated backboard strips in a direction substantially perpendicular to the plane defined by said mounting flanges, said component bearing elements projecting within the volume defined by said shielding partitions and said backboard strips.

6. In electrical apparatus, a frame having first and second mounting members presenting spaced mounting flanges, a contact carrying backboard strip supported in a predetermined position with respect to said mounting members, a channel detachably secured in abutting relationship with said mounting members, a plurality of sets of risers spaced transversely of the longitudinal axis of said channel and secured at one end thereto, and a contact carrying board anchored to the other ends of said risers having contacts maintained in engagement with said contacts of said backboard strip when said channel is secured to said mounting members.

7. In electrical apparatus, a detachable element comprising a channel adapted to receive components, a contact strip secured to and spaced from said channel extending substantially parallel to said channel, and a terminal bearing sheet of relatively non-conductive material secured to and carried between said channel and said contact strip.

8. In electrical apparatus, an element comprising a channel adapted to receive components, a contact bearing strip of relatively non-conductive material secured to the base of said channel and spaced from said channel extending substantially parallel to said channel, and a terminal bearing sheet of relatively non-conductive material secured to and carried between said channel and said contact strip.

9. In electrical apparatus, an element comprising a channel adapted to receive components, a contact bearing strip of relatively non-conductive material secured to the base of said channel and spaced from said channel extending substantially parallel to said channel, a terminal receiving flat sheet of relatively non-conductive material secured to and carried between said channel and said contact strip with the said sheet lying wholly within the projected planes of the legs of said channel, a plurality of terminals secured to said terminal receiving sheet, and electrical circuit components connected between said terminals.

10. In electrical apparatus, a component bearing element including a channel, an electric valve socket apertured to receive the valve prongs mounted through the base of said channel, a contact bearing strip of relatively non-conductive material secured to said channel and extending substantially parallel to said channel and spaced therefrom, and a terminal bearing sheet of relatively non-conductive material secured to and carried between said channel and said contact bearing strip.

11. In electrical apparatus, a frame provided with a set of spaced chassis mounting faces and a set of spaced contact board mounting faces, a first contact bearing board secured to said contact board mounting faces, an extender chassis secured to said chassis mounting faces and having a second contact bearing board with its contacts maintained in engagement with the contacts of said first contact bearing board and a third contact bearing board with contacts connected to corresponding contacts of said second contact bearing board, and an operating chassis provided with a fourth contact bearing board secured to said extender chassis in a position engaging the contacts of said fourth contact bearing board with the contacts of said third contact bearing board.

12. In electrical apparatus, a frame provided with a set of spaced chassis mounting faces and a set of spaced contact board mounting faces, said sets being separated by a predetermined distance, a first contact bearing board secured to said contact board mounting faces, an extender chassis secured to said chassis mounting faces and having a second contact bearing board with its contacts maintained in engagement with the contacts of said first contact bearing board and a third contact bearing board with contacts connected to corresponding contacts of said second contact bearing board, and an operating chassis provided with a fourth contact bearing board secured to said extender chassis in a position engaging the contacts of said fourth contact bearing board with the contacts of said third contact bearing board, the separation of said second and third contact bearing boards approximating said predetermined distance.

13. In electrical apparatus, a frame provided with a set of spaced chassis mounting faces and a set of spaced contact board mounting faces, said sets being separated by a predetermined distance, a first contact bearing board secured to said contact board mounting faces, an extender chassis secured to said chassis mounting faces and having a second contact bearing board with its contacts maintained in engagement with the contacts of said first contact bearing board and a third contact bearing board with contacts connected to corresponding contacts of said second contact bearing board, said second and third contact bearing boards being separated by at least said predetermined distance, and an operating chassis provided with a fourth contact bearing board secured to said extender chassis in a position engaging the contacts of said fourth contact bearing board with the contacts of said third contact bearing board.

14. In electrical apparatus, a component bearing element including a channel, a plurality of electric valve sockets extending through the base of said channel, a contact bearing strip of relatively non-conductive material secured to said channel on the base side of said channel and extending substantially parallel to said channel and spaced therefrom, a first terminal bearing sheet of relatively non-conductive material secured to and carried between said channel and said contact bearing strip, a second terminal bearing sheet of relatively non-conductive material secured to said channel and extending from the leg side of said channel, a plurality of electric valves mounted in said sockets with their envelopes projecting on the leg side of said channel, a plurality of dissipative elements mounted with a first power density on the terminals of said second terminal bearing sheet, and a plurality of dissipative elements mounted with a relatively lower power density on the terminals of said first terminal bearing sheet.

15. In a structure accommodating electrical apparatus, a frame having a first arcuate mounting face of substantially circular form, a second arcuate mounting face on said frame displaced axially from said first face, a plurality of electric contact members carried by said frame in predetermined relation to said arcuate mounting faces, and a component bearing element detachably secured in abutting relationship with said arcuate mounting faces, said component bearing element having a plurality of contact members maintained in resilient engagement with said first mentioned contact members when said component bearing element is so secured.

16. In a structure accommodating electrical apparatus including an acoustic line, a frame centrally supporting an acoustic line, a first arcuately disposed set of mounting faces, a second arcuately disposed set of mounting faces displaced from said first set of mounting faces along a dimension paralleling said acoustic line, a plurality of electric contact members secured in predetermined relation to said mounting faces, and a component bearing element detachably secured in abutting relationship with at least a pair of said mounting faces, said component bearing element having a plurality of contact members maintained in engagement with first mentioned contact members when said component bearing element is so secured.

JOHN PRESPER ECKERT, Jr.
JOHN C. SIMS, Jr.
ISAAC L. AUERBACH.

REFERENCES CITED

The following references are of record in the file of this patent:

UNITED STATES PATENTS

| Number | Name | Date |
| --- | --- | --- |
| 2,077,160 | Wilson | Apr. 13, 1937 |
| 2,226,745 | Schrack | Dec. 31, 1940 |
| 2,341,029 | Field | Feb. 8, 1944 |
| 2,428,322 | Robertson | Sept. 30, 1947 |
| 2,438,025 | Taliaferro | Mar. 16, 1948 |
| 2,488,372 | Breisch | Nov. 15, 1949 |

FOREIGN PATENTS

| Number | Country | Date |
| --- | --- | --- |
| 570,877 | Great Britain | July 26, 1945 |